US008665864B1

(12) United States Patent
Delker et al.

(10) Patent No.: US 8,665,864 B1
(45) Date of Patent: Mar. 4, 2014

(54) METHOD AND SYSTEM FOR CALL SETUP WITH DATABASELESS ADDRESS TRANSLATION

(75) Inventors: Jason R. Delker, Olathe, KS (US);
Jeremy R. Breau, Leawood, KS (US);
John M. Everson, Parker, CO (US);
Lars J. Hacking, Kansas City, MO (US); Robert H. Burcham, Overland Park, KS (US); Matthew C. Schlesener, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 448 days.

(21) Appl. No.: 12/871,465

(22) Filed: Aug. 30, 2010

(51) Int. Cl.
*H04L 12/66* (2006.01)

(52) U.S. Cl.
USPC ............................................ 370/352

(58) Field of Classification Search
USPC ............... 370/352, 329, 401; 709/206; 1/1;
714/47.2; 455/560, 445; 379/207.11;
705/7.36
See application file for complete search history.

(56) References Cited

U.S. PATENT DOCUMENTS

| 6,731,735 | B1 * | 5/2004 | Cook ........................ 379/207.11 |
| 6,865,391 | B1 * | 3/2005 | Oh et al. ........................ 455/445 |
| 6,981,023 | B1 * | 12/2005 | Hamilton et al. ............. 709/206 |
| 7,263,636 | B1 * | 8/2007 | Buller et al. ................. 714/47.2 |
| 7,325,016 | B1 * | 1/2008 | Shee ..................................... 1/1 |
| 7,409,379 | B1 * | 8/2008 | Katzer ................................. 1/1 |
| 8,401,890 | B1 * | 3/2013 | Brack et al. .................. 705/7.36 |
| 2005/0124386 | A1 * | 6/2005 | Oh et al. ........................ 455/560 |
| 2008/0316998 | A1 * | 12/2008 | Procopio et al. .............. 370/352 |
| 2009/0168787 | A1 * | 7/2009 | Ansari et al. .................. 370/401 |
| 2009/0285205 | A1 * | 11/2009 | Melick et al. ................. 370/352 |
| 2010/0103888 | A1 * | 4/2010 | Takano et al. ................. 370/329 |

* cited by examiner

*Primary Examiner* — Luat Phung
*Assistant Examiner* — Parth Patel (57) ABSTRACT

A method to translate between Public Switched Telephone Network (PSTN) numbers and Voice over Internet Protocol (VoIP) addresses without performing an address translation database lookup. A network gateway receives and translates a first endpoint identifier associated with a destination client device to a second endpoint identifier associated with the destination client device. The first endpoint identifier is either a PSTN number or a VoIP address comprising at least the PSTN number and a predefined suffix and the second endpoint identifier is the other of the PSTN number and the VoIP address. The network gateway translates the first endpoint identifier to the second endpoint identifier without performing an address translation database lookup, by either adding the predefined suffix to or removing the predefined suffix from the first endpoint identifier. The network gateway generates and transmits a second session initiation message containing the second endpoint identifier to facilitate establishment of the session.

4 Claims, 8 Drawing Sheets

METHOD AND SYSTEM FOR CALL SETUP WITH DATABASELESS ADDRESS TRANSLATION

BACKGROUND

Packet-switched networks, such as the Internet, are increasingly being used to carry traffic, such as voice calls, that have traditionally used circuit-switched networks, such as the public switched telephone network (PSTN). This shift is being motivated by a number of different factors. For example, packet-switched networks may allow voice traffic to be integrated with data, video, and other traffic. Packet-switched networks are typically less expensive to build and maintain than circuit-switched networks, and packet-switched networks often have higher bandwidth than is available in most circuit-switched networks. However, integration between circuit- and packet-switched networks is important because packet-switched networks are likely to co-exist with circuit-switched networks for some time.

Circuit-switched voice traffic calls are typically established using the Public Switched Telephone Network (PSTN), which makes use of the Signaling System #7 (SS7) protocol. In order to initiate a circuit-switched call, a source client device typically originates a call by specifying a PSTN number associated with a destination client device to a network switch associated with source client device. The network switch associated with the source client device transmits to the circuit-switched network an Integrated Service Digital Network User Part (ISUP) Initial Address Message (IAM) containing the PSTN number. The ISUP IAM is routed through the circuit-switched network to a network switch associated with the destination client device. The network switch associated with the destination client device then attempts to contact the destination client device to initiate the call.

By contrast, packet-switched voice traffic calls, such as Voice over Internet Protocol (VoIP) calls, are typically established using the Internet and may make use of the Session Initiation Protocol (SIP). In a packet-switched call, a source client device typically originates a call by specifying a VoIP address associated with a destination client device to a SIP proxy associated with the source client device. The SIP proxy associated with the source client device transmits to the packet-switched network a SIP INVITE message containing the VoIP address. The SIP INVITE message is routed through the packet-switched network to a SIP proxy associated with the destination client device. The SIP proxy associated with the destination client device then attempts to contact the destination client device to initiate the call.

OVERVIEW

As a result of the co-existence of circuit- and packet-switched networks, it would be desirable to provide a means for mapping between the two. One way of performing this mapping is through an address translation database lookup. An example of such an address translation database lookup is performed in the E.164 Number Mapping (ENUM) standard. In particular, a Domain Name System (DNS) or other address translation database can be queried to translate between PSTN numbers and VoIP addresses. For example, an ENUM-enabled network element, such as a media gateway, may first translate a received PSTN number into an ENUM domain that is derived from the PSTN number. For example, for a given PSTN number:
  +1 1234567890
the ENUM domain would be:
  0.9.8.7.6.5.4.3.2.1.1.e164.arpa
The media gateway may then query a DNS with the ENUM domain. When queried with the ENUM domain, the DNS will return to the media gateway a result in the form of a Naming Authority Pointer Resource (NAPTR) record that includes the desired information, in this case a VoIP address, such as:
  johnsmith@domain.net
Thus, each time a circuit-switched client device sends a request to establish a session with a packet-switched client device, an address translation database lookup will be performed by a media gateway to translate between the PSTN number entered at the circuit-switched client device and the VoIP address used to identify the packet-switched client device.

Unfortunately, however, performing numerous address translation database lookups like this can result in a large consumption of resources and processing power.

Disclosed herein is an improved method and corresponding structure for interfacing between circuit-switched and packet-switched networks without requiring that an address translation database lookup be performed each time a request is received to establish a session between a circuit-switched and a packet-switched network device. According to an exemplary embodiment of the method, a network gateway will translate between PSTN numbers and VoIP addresses without performing an address translation database lookup. In particular, the network gateway will translate between a PSTN number and a VoIP address comprising at least the PSTN number and a suffix. The suffix may include an "@" followed by a predefined domain name.

For example, the domain may be:
  domain.com
and the suffix may then be:
  @domain.com
Thus, for a given PSTN number:
  +1 1234567890
the corresponding VoIP address will comprise at least the PSTN number and the suffix, for example:
  11234567890@domain.com
In this way, the network gateway will be able to translate between the PSTN number and the VoIP address without performing an address translation database lookup. In particular, if the network gateway receives a PSTN number, the network gateway will translate the PSTN number to the VoIP address by adding at least the suffix to the PSTN number. Similarly, if the network gateway receives a VoIP address, the network gateway will translate the VoIP address to the PSTN number by removing at least the suffix from the VoIP address.

To facilitate this in an exemplary embodiment, the network gateway may be limited to servicing devices in a given domain so that the suffix will be the same for all translations. In this case, the network gateway will require only the PSTN number in order to determine the VoIP address. Similarly, the network gateway will require only the VoIP address in order to determine the PSTN number. Consequently, the method obviates the need for a network gateway (or other network element) to perform an address translation database lookup.

According to an exemplary embodiment of the method, the network gateway will receive from a source client device a first session initiation message including a first endpoint identifier (either a PSTN number or a VoIP address) that is associated with the destination client device. The network gateway will then translate the first endpoint identifier to a second endpoint identifier (the other of a PSTN number and a VoIP address) without performing an address translation database lookup. This translation may involve either adding or removing at least a suffix, as described above. The network gateway will then generate a second session initiation message including the second endpoint identifier and will transmit the second session initiation message to a network element serving the destination client, to facilitate establishment of a session between the source client device and the destination client device.

According to another exemplary embodiment, the source client device and the destination client device will each have a respective device type (e.g., either a packet-switched network client device type or a circuit-switched network client device type), and the network gateway may determine if the device types of the source and destination client devices are the same.

The network gateway may use several means to determine the device types of the source and destination client devices. In one embodiment, the device type of the source client device may be determined from the received first session initiation message. For example, if the received session initiation message is of a type used in a circuit-switched protocol, such as an ISUP IAM, the network gateway may determine that the source client device is a circuit-switched network client device. On the other hand, if the received session initiation message is of a type used in a packet-switched protocol, such as a SIP INVITE message, the network gateway may determine that the source client device is a packet-switched network client device. Other means of determining the device type of the source client device are possible as well.

The network gateway may use a different means to determine the device type of the destination client device.

For instance, consider a destination client device that is operable as both a circuit-switched network client device and a packet-switched network client device. When such a destination client device is connected to a packet-switched network, such as the Internet, the destination client device will operate as a packet-switched network client device and will thus have the packet-switched network client device type. On the other hand, when the destination client device is not connected to a packet-switched network (e.g., by user choice or because such a network is currently unavailable) the destination client device will operate as a circuit-switched network client device and will thus have the circuit-switched network client device type.

Accordingly, by determining whether the destination client device is connected to a packet-switched network, the network gateway may determine the device-type of the destination client device. One means of determining whether the destination client device is connected to a packet-switched network involves the network gateway evaluating the presence status of the destination client device. The presence status of the destination client device may indicate whether the destination client device is currently connected to a packet-switched network ("online") or is not currently connected to a packet-switched network ("offline").

When the destination client device connects to a packet-switched network, the destination client device may provide its presence status to a presence service that stores the presence status for the destination client device. In particular, the presence service may subscribe to the destination client device, such that the destination client device will send to the presence service update notifications each time the device changes its presence status. The network gateway may, in turn, subscribe to the presence service so as to receive the updates regarding changes in the presence status of the destination client device. Thus, in order to determine whether the destination client device is currently connected to a packet-switched network, the network gateway may evaluate the most recent presence status update received regarding the destination client device.

If the network gateway discovers that the most recent presence status of the destination client device indicates that the device is "online", the network gateway may determine that the destination client device is connected to a packet-switched network and will thus have the packet-switched network client device type. On the other hand, if the network gateway discovers that the most recent presence status of the destination client device indicates that the device is "offline", the network gateway may determine that the destination client device is not connected to a packet-switched network and will thus have the circuit-switched network client device type. Other means of determining the device type of the destination client device are possible as well.

Regardless of the means, once the network gateway determines the device types of the source and destination client devices, the network gateway may determine if the device types of the source and destination client devices are the same. If the determination is that the device types are the same, the network gateway will not translate the first endpoint identifier to a second endpoint identifier. On the other hand, if the determination is that the device types are not the same, the network gateway will translate the first endpoint identifier to a second endpoint identifier. The network gateway will translate between the endpoint identifiers without performing an address translation database lookup, through either adding or removing at least a suffix, as described above.

According to another exemplary embodiment, the translation between a PSTN number and a VoIP address may be performed by an application running on a source client device. In this embodiment, the source client device receives from a user a PSTN number that is associated with a destination client device, and the source client device translates the PSTN number to a VoIP address without performing an address translation database lookup. This translation includes adding at least a suffix, as described above. The source client device will then generate and transmit to a network gateway a first session initiation message containing the VoIP address.

In this embodiment, upon receiving the first session initiation message, the network gateway may determine if the destination client device is a packet-switched network client device or a circuit-switched network client device, as described above. If the determination is that the destination client device is a packet-switched network client device, the network gateway will transmit the first session initiation message containing the VoIP address to a network element serving the destination client device, to facilitate establishment of the session between the source client device and the destination client device.

On the other hand, if the determination is that the destination client device is a circuit-switched network client device, the network gateway will translate the VoIP address back to the PSTN number without performing an address translation database lookup. In this case, the translation includes removing at least the suffix, as described above. The network gateway will then generate a second session initiation message containing the PSTN number and will transmit the second session initiation message to a network element serving the destination client device, to facilitate establishment of the session between the source client device and the destination client device.

These as well as other aspects and advantages will become apparent to those of ordinary skill in the art by reading the following detailed description, with reference where appropriate to the accompanying drawings. Further, it should be understood that the foregoing overview and other arrangements and functions described herein are intended to be examples only and do not necessarily limit the scope of the invention, which is defined by the claims.

DETAILED DESCRIPTION

1. Exemplary Architecture

Figure 1:
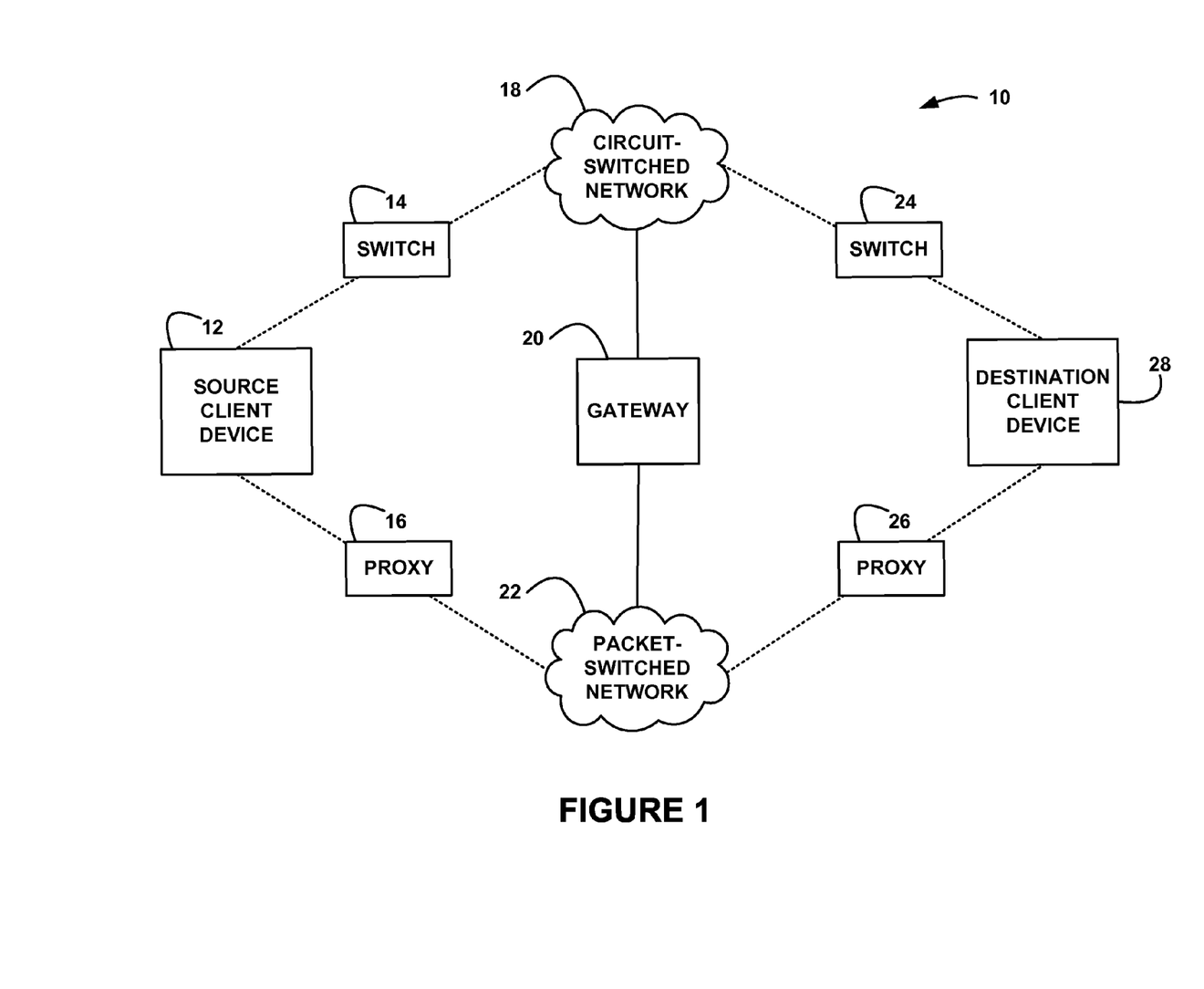
FIG. 1 is a simplified block diagram of a network in which an exemplary embodiment of the present method can be implemented.

FIG. 1 is a simplified block diagram of a network in which an exemplary embodiment of the present method can be implemented. It should be understood, of course, that this and other arrangements and functions described herein are provided by way of example only and that numerous variations may be possible. For instance, elements can be added, omitted, combined, distributed, reordered, repositioned, or otherwise changed while remaining within the scope of the invention as defined by the claims. Further, it should be understood that various functions described herein can be carried out by hardware, firmware, and/or software (e.g., one or more processors programmed with machine language instructions to carry out the functions).

FIG. 1 depicts a network 10 that includes a source client device 12 that may be equipped to communicate with a circuit-switched network 18 via a circuit-switched network interface, or to communicate with a packet-switched network 22 via a packet-switched network interface. In some embodiments, the source client device 12 may be equipped to communicate with both the circuit-switched network 18 and the packet-switched network 22.

The source client device 12 is shown being served by a switch 14 and/or a proxy 16 (as illustrated by the dotted lines). In embodiments where the source client device 12 is equipped to communicate with the circuit-switched network 18, the source client device 12 is operable to communicate with the circuit-switched network 18 through the switch 14. In some embodiments, the circuit-switched network 18 may be the Public Switched Telephone Network (PSTN) and the switch 14 may be a standard telephone switch.

Similarly, in embodiments where the source client device 12 is equipped to communicate with the packet-switched network 22, the source client device 12 is operable to communicate with the packet-switched network 22 through the proxy 16. In some embodiments, the packet-switched network 22 may be the Internet and the proxy 16 may be a Session Initiation Protocol (SIP) proxy, such as a Call Session Control Function (CSCF), for instance.

Network 10 further includes a destination client device 28 that may be equipped to communicate with the circuit-switched network 18 via a circuit-switched network interface, or to communicate with the packet-switched network 22 via a packet-switched network interface. In some embodiments, the destination client device 28 may be equipped to communicate with both the circuit-switched network 18 and the packet-switched network 22.

The destination client device 28 is shown being served by a switch 24 and/or a proxy 26 (as illustrated by the dotted lines). In embodiments where the destination client device 28 is equipped to communicate with the circuit-switched network 18, the destination client device 28 may be operable to communicate with the circuit-switched network 18 through the switch 24. In some embodiments, the switch 24 may be a standard telephone switch.

Similarly, in embodiments where the destination client device 28 is equipped to communicate with the packet-switched network 22, the destination client device 28 may be operable to communicate with the packet-switched network 22 through the proxy 26. In some embodiments, the proxy 26 may be a SIP proxy, such as a CSCF.

In network 10, both the circuit-switched network 18 and the packet-switched network 22 are shown connected to a network gateway 20. The network gateway 20 is further described with reference to FIG. 2.

Figure 2:
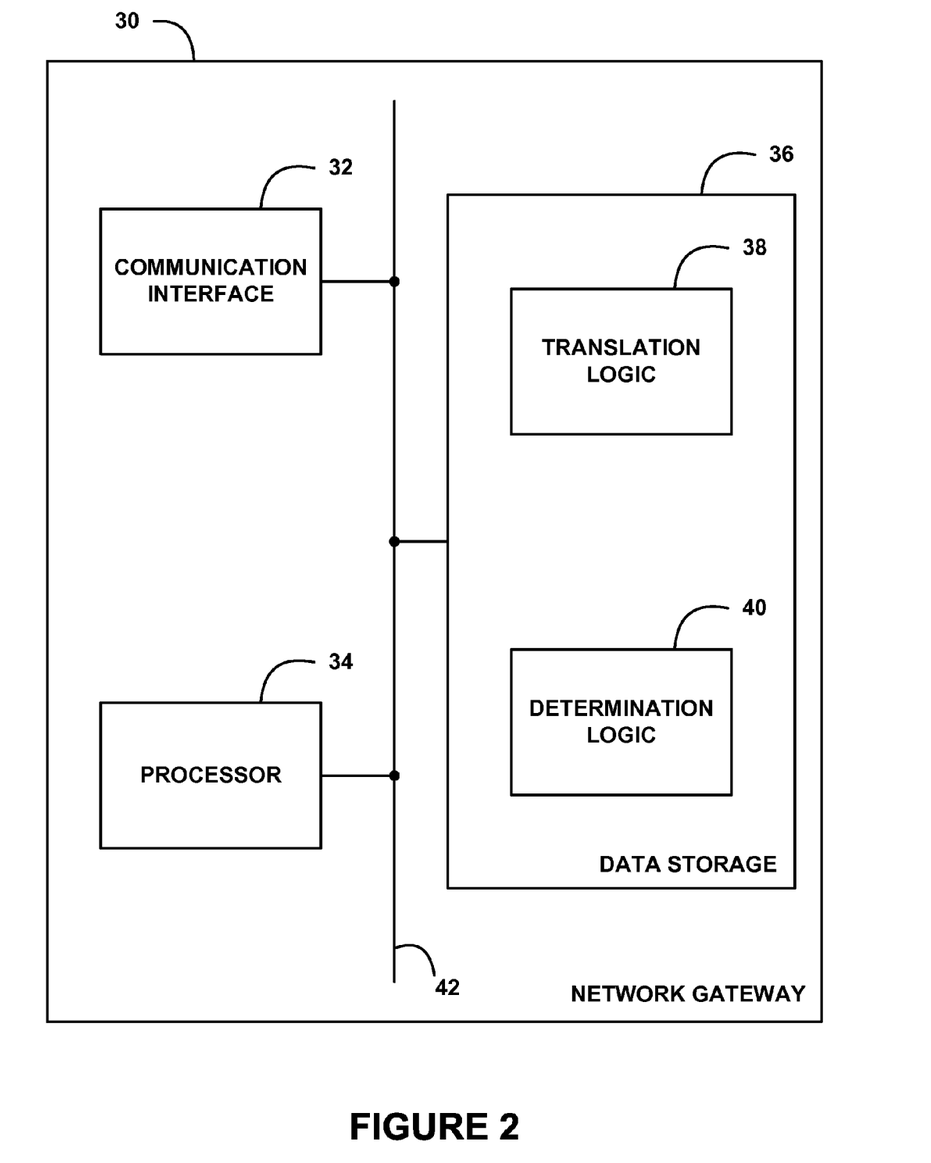
FIG. 2 is a simplified block diagram of a network gateway for use in an exemplary embodiment of the present method.

FIG. 2 is a simplified block diagram of a network gateway 30 for use in an exemplary embodiment of the present method. Network gateway 30 is shown comprising a communication interface 32, a processor 34, and data storage 36 including translation logic 38 and determination logic 40. The elements of network gateway 30 are shown connected together by a system bus or other mechanism 42.

Communication interface 32 is operable to receive a first session initiation message that defines a request from a source client device seeking to establish a session with a destination client device, and that contains a first endpoint identifier associated with the destination client device. The first session initiation message may be received over a circuit-switched network or a packet-switched network. Additionally, the communication interface 32 is operable to transmit a second session initiation message containing a second endpoint identifier to a network element serving the destination client device, to facilitate establishment of the session between the source client device and the destination client device. Like the first, the second session initiation message may be transmitted over either a circuit-switched network or a packet-switched network.

Processor 34 may comprise one or more general purpose processors (e.g., INTEL microprocessors) and/or dedicated processors (e.g., digital signal processors). Data storage 36, in turn, may comprise one or more magnetic, optical, organic, or other storage components, whether volatile or non-volatile, and may be integrated in whole or in part with processor 34. Data storage 36 further comprises translation logic 38 and determination logic 40.

Translation logic 38 is executable by the processor 34 to translate the first endpoint identifier to the second endpoint identifier without performing an address translation database lookup, as described above. In some embodiments, the first endpoint identifier may be a PSTN number and the second endpoint identifier may be a VoIP address. In other embodiments, the first endpoint identifier may be a VoIP address and the second endpoint identifier may be a PSTN number. The translation logic 38 is additionally executable by the processor 34 to generate the second session initiation message containing the second endpoint identifier, for transmission by the communication interface 32.

In some embodiments, the source client device from which the first session initiation message is received and the destination client device to which the second session initiation message is transmitted may each have a respective device type. For example, each client device may have either a packet-switched network client device type or a circuit-switched network client device type. In these embodiments, the determination logic 40 is executable by the processor 34 to determine if the device types of the source client device and the destination client device are the same, as described above. If the determination is that the device types are the same, the network gateway 30 will not execute the translation logic 38 in response to receipt of the first session initiation message. On the other hand, if the determination is that the device types are not the same, the network gateway 30 will execute the translation logic 38 in response to receipt of the first session initiation message.

The network gateway 30 may additionally comprise elements other than those shown.

Figure 3:
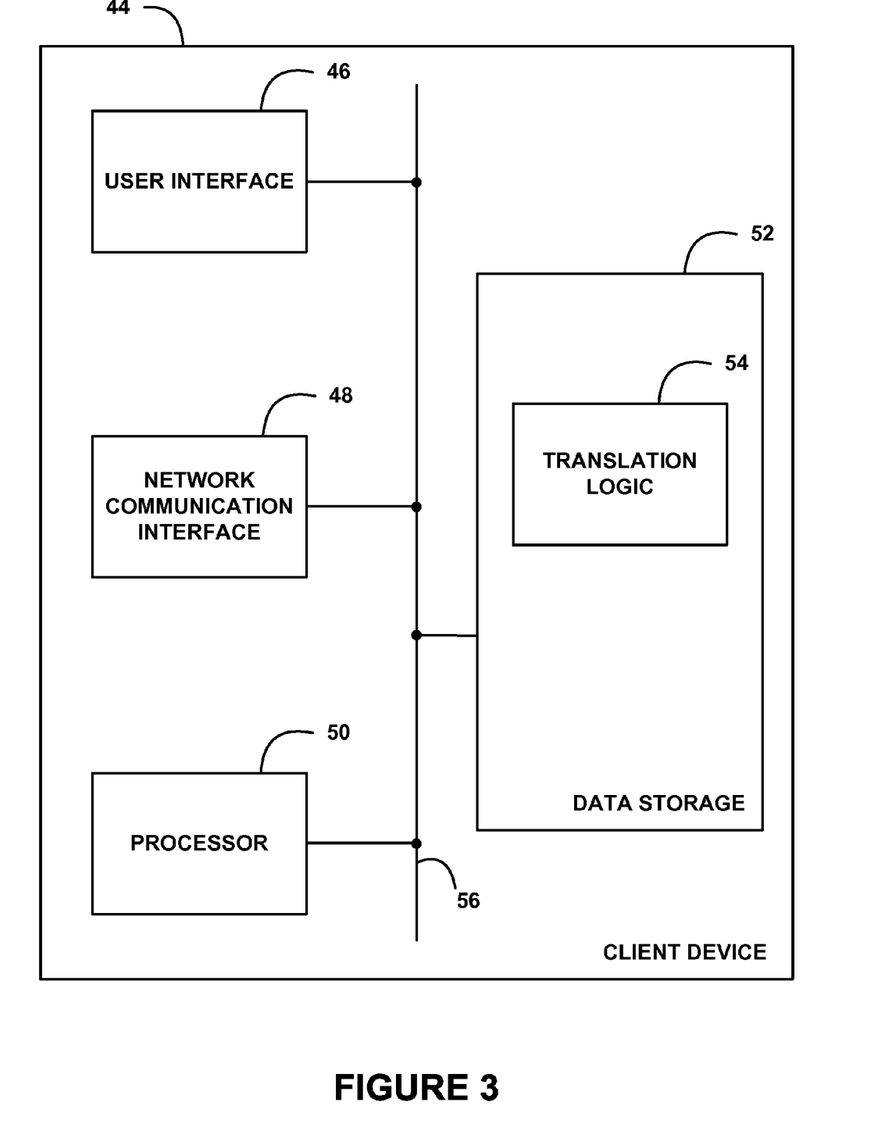
FIG. 3 is a simplified block diagram of a client device for use in an exemplary embodiment of the present method.

FIG. 3 is a simplified block diagram of a client device 44 for use in an exemplary embodiment of the present method. The client device 44 is shown comprising a user interface 46, a network communication interface 48, a processor 50, and data storage 52 including translation logic 54. The elements of client device 44 are shown connected together by a system bus or other mechanism 56.

User interface 46 comprises input/output components, such as a display, a speaker, a keypad, and a microphone, for presenting content and other information to a user and for receiving input from a user. The client device 44 may be operable to receive a PSTN number, VoIP address, or other information from a user through the user interface 46. The client device 44 may allow a user to enter the information manually (such as by dialing a PSTN number or typing a VoIP address), or to select the information from a list, such as an address book stored on the client device 44.

The client device 44 may be a wired device or it may be a wireless device. In the event that the client device 44 is a wired device, network communication interface 48 may comprise a conventional landline telephone interface circuit for communication with a circuit-switched network. Additionally, network communication interface 48 may comprise a modem for communication with a packet-switched network. If the client device 44 is a wireless device, the network communication interface 48 may comprise a chipset and antenna for communicating with a cellular radio access network that provides connectivity in turn with one or both of a circuit-switched network and a packet-switched network. In either case, the network communication interface 48 facilitates communication with one or more of the circuit-switched and packet-switched networks according to an agreed protocol, such as the SIP protocol or the SS7 protocol.

Processor 50 may comprise one or more general purpose processors (e.g., INTEL microprocessors) and/or dedicated processors (e.g., digital signal processors). Data storage 52, in turn, may comprise one or more magnetic, optical, organic, or other storage components, whether volatile or non-volatile, and may be integrated in whole or in part with processor 50. Data storage 52 further comprises translation logic 54.

The client device 44 may additionally comprise elements other than those shown.

2. Exemplary Operation

Figure 4:
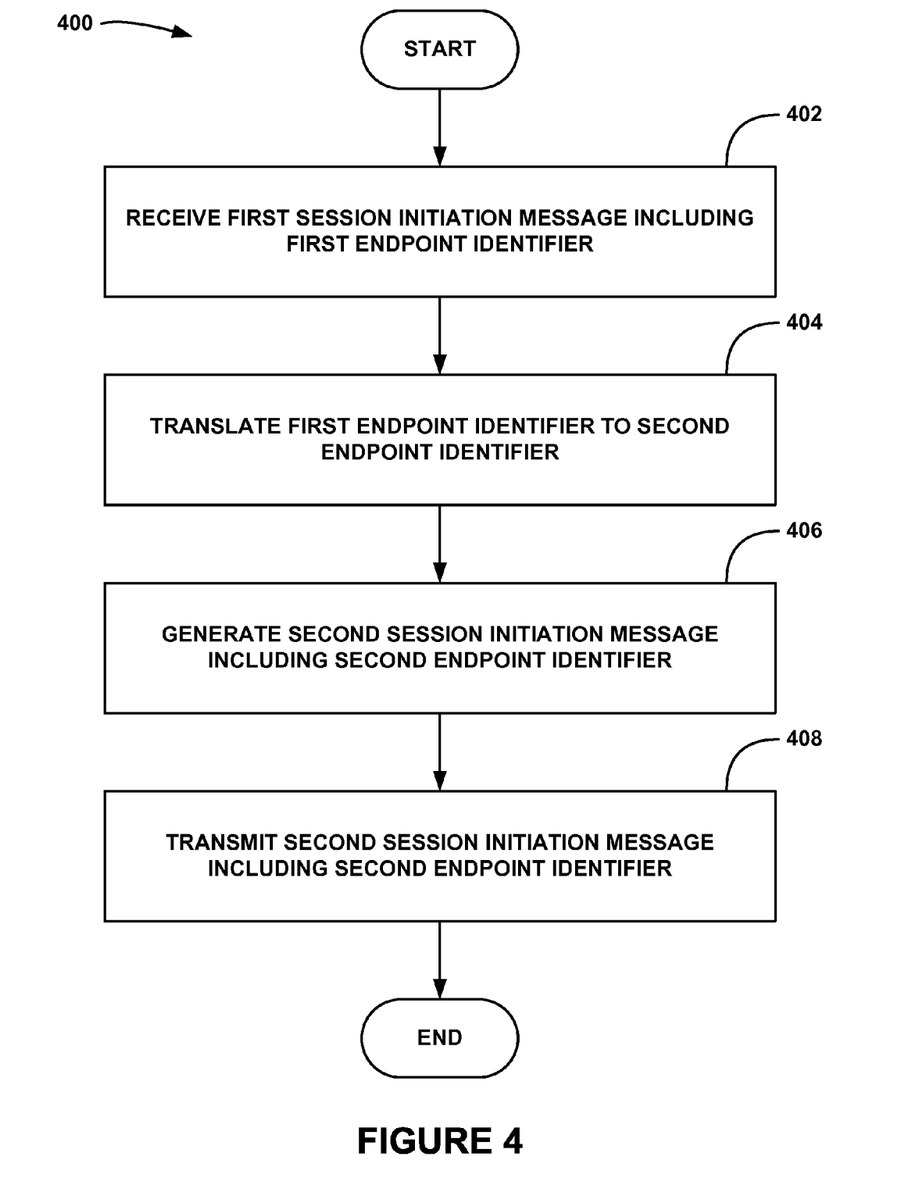
FIG. 4 is a flow chart depicting functions that can be carried out for session establishment, in accordance with an exemplary embodiment.

FIG. 4 is a flow chart depicting a method 400 that can be carried out for session establishment in accordance with an exemplary embodiment. Method 400 begins at step 402 where a network gateway receives a first session initiation message. The first session initiation message indicates that a source client device wishes to establish a session with a destination client device, and accordingly the first session initiation message includes a first endpoint identifier associated with the destination client device. The first endpoint identifier may be, for example, a PSTN number, a VoIP address, or another identifier associated with the destination client device. The first session initiation message may be, for example, an ISUP IAM or a SIP INVITE message. Other message types are possible as well.

The source client device may be either a circuit-switched network client device or a packet-switched network client device. The first session initiation message may take different forms depending on the device type of the source client device.

For example, if the source client device is a circuit-switched network client device, the source client device may transmit to a network element serving the source client device the digits of a PSTN number associated with the destination client device. The network element serving the source client device may then generate and transmit to the network gateway an ISUP IAM including the PSTN number.

On the other hand, if the source client device is a packet-switched network client device, the source client device may transmit to a network element serving the source client device a VoIP address associated with the destination client device. The network element serving the source client device may then generate and transmit to the network gateway a SIP INVITE message including the VoIP address.

Thus, the first session initiation message may be an ISUP IAM including a PSTN number or a SIP INVITE message including a VoIP address. In either case, the network gateway receives the first session initiation message containing the first endpoint identifier (either the PSTN number or the VoIP address).

At step 404, the network gateway translates the first endpoint identifier to a second endpoint identifier without performing an address translation database lookup. The second endpoint identifier is also associated with the destination client device.

If the first endpoint identifier is a PSTN number, the second endpoint identifier will be a corresponding VoIP address that includes the PSTN number and a suffix made up of at least an "@" and a predefined domain name. Thus, the network gateway translates the first endpoint identifier (the PSTN number) to the second endpoint identifier (the VoIP address) by adding at least the suffix to the PSTN number.

On the other hand, if the first endpoint identifier is a VoIP address, the second endpoint identifier will be a corresponding PSTN that is included in the VoIP address. Specifically, the VoIP address comprises the PSTN number and a suffix made up on at least an "@" and a predefined domain name. Thus, the network gateway translates the first endpoint identifier (the VoIP address) to the second endpoint identifier (the PSTN number) by removing at least the suffix from the VoIP address.

At step 406, the network gateway generates a second session initiation message that contains the second endpoint identifier. In the event that the second endpoint identifier is a VoIP address, the second session initiation message may be, for example, a SIP INVITE message. If the second endpoint identifier is a PSTN number, the second session initiation message may be, for example, an ISUP IAM.

At step 408, the network gateway transmits the second session initiation message to a network element serving the destination client device, to facilitate establishment of the session between the source client device and the destination client device. The destination client device may be either a packet-switched network client device or a circuit-switched network client device. In the event that the destination client device is a packet-switched network client device, the second endpoint identifier may be a VoIP address, and the network element serving the destination client device is a packet-switched network element such as, for example, a SIP proxy. If the destination client device is a circuit-switched client device, the second endpoint identifier may be a PSTN number, and the network element serving the destination client device is a circuit-switched network element such as, for example, a standard telephone switch. In any case, the network element serving the destination client device uses the second endpoint identifier to identify the appropriate destination client device and accordingly contacts the destination client device. In this way, the session may be established between the source client device and the destination client device.

Figure 5:
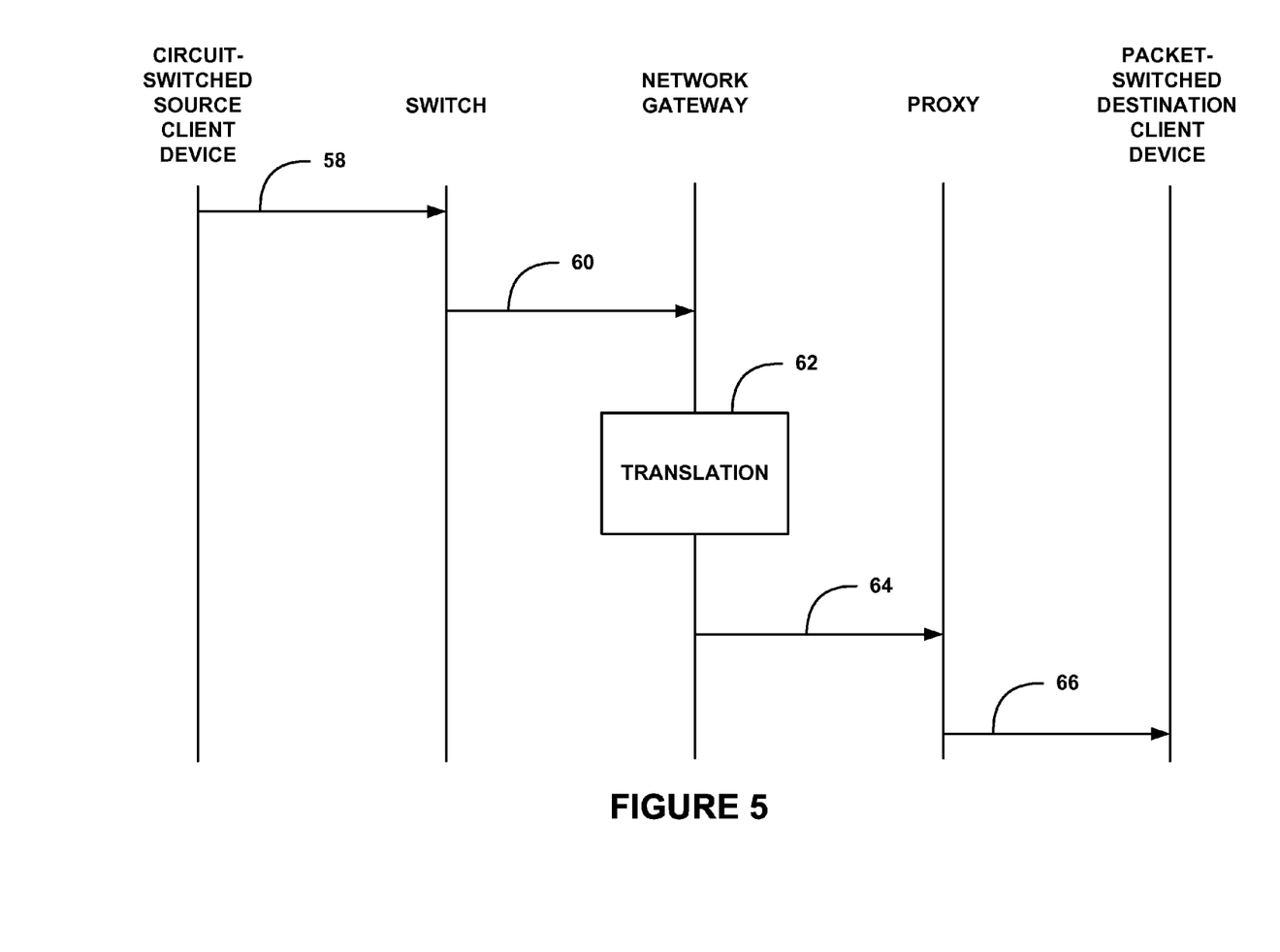
FIG. 5 is a simplified call flow illustrating a method for session establishment, in accordance with an exemplary embodiment.

FIG. 5 is a simplified call flow illustrating a method for session establishment in accordance with an exemplary embodiment. FIG. 5 illustrates an embodiment in which the source-client device is a circuit-switched network client device and the destination client device is a packet-switched network client device. Accordingly, the source client device is served by a circuit-switched network device, shown as a telephone switch, whereas the destination client device is served by a packet-switched network device, shown as a SIP proxy.

A message 58, sent from the source client device to the switch serving the source client device, contains the dialed digits of a PSTN number associated with the destination client device. A first session initiation message 60 is then generated by the switch. The first session initiation message 60 may be, for example, an ISUP IAM. The first session initiation message 60 indicates that the source client device wishes to establish a session with the destination client device, and accordingly includes a first endpoint identifier associated with the destination client device. In this embodiment, the first endpoint identifier is the PSTN number identifying the destination client device that the switch received from the source client device in the message 58.

The network gateway receives the first session initiation message 60 including the PSTN number. At step 62, the network gateway translates the PSTN number to a second endpoint identifier without performing an address translation database lookup. The second endpoint identifier is similarly associated with the destination client device. In this embodiment, the second endpoint identifier is a VoIP address comprising at least the PSTN number and a suffix comprising an "@" followed by a predefined domain name. Thus, the network gateway translates the PSTN number to the VoIP address by adding at least the suffix to the PSTN number.

If the network gateway is limited to serving source and destination clients in a given domain, the suffix added to a PSTN number will be the same for all translations and will be predefined. In this way, the network gateway is able to translate the PSTN number to the VoIP address without performing an address translation database lookup.

The network gateway then generates a second session initiation message 64 that includes the VoIP address. The second session initiation message 64 may be, for example, a SIP INVITE message. The second session initiation message 64 indicates that the source client device wishes to establish a session with the destination client device, and accordingly includes the VoIP address associated with the destination client device.

The network gateway transmits the second session initiation message 64 to the proxy serving the destination client device, and the proxy uses the VoIP address to identify the appropriate destination client device. At step 66, the proxy pages or otherwise contacts the destination client device. In this way, the session may be established between the source client device and the destination client device.

Figure 6:
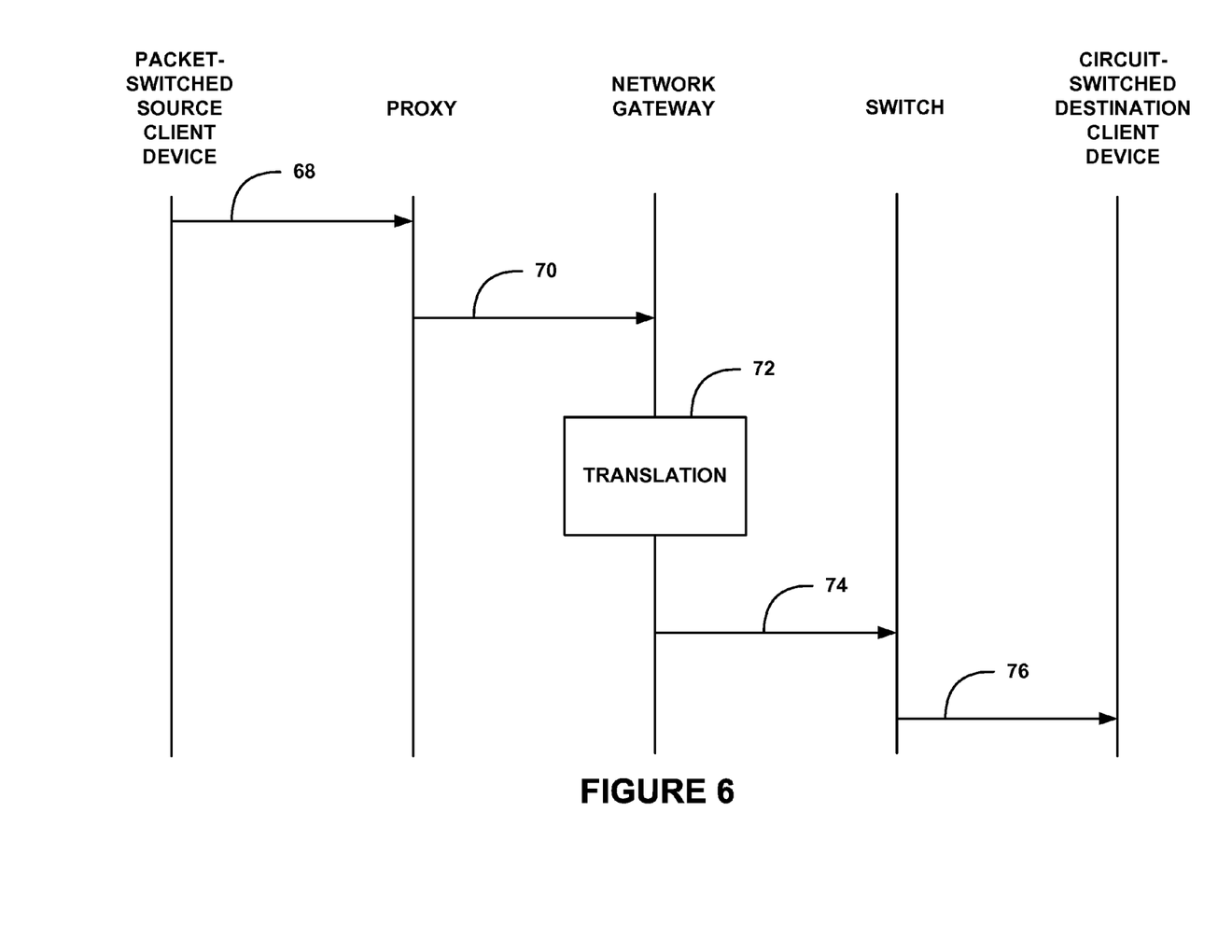
FIG. 6 is a simplified call flow illustrating a method for session establishment, in accordance with an exemplary embodiment.

FIG. 6 is a simplified call flow illustrating a method for session establishment, in accordance with another exemplary embodiment. FIG. 6 illustrates an embodiment in which the source client device is a packet-switched network client device and the destination client device is a circuit-switched network client device. Thus, the source client device is served by a packet-switched network device, shown as a SIP proxy, whereas the destination client device is served by a circuit-switched network device, shown as a standard telephone switch.

A message 68, sent from the source client device to the proxy serving the source client device, contains a VoIP address associated with the destination client device. A first session initiation message 70 is then generated by the proxy. The first session initiation message 70 may be, for example, a SIP INVITE message. The first session initiation message 70 indicates that the source client device wishes to establish a session with the destination client device, and accordingly includes a first endpoint identifier associated with the destination client device. In this embodiment, the first endpoint identifier is the VoIP address identifying the destination client device that the proxy received from the source client device in the message 68.

The network gateway receives the first session initiation message 70 including the VoIP address. At step 72, the network gateway translates the VoIP address to a second endpoint identifier without performing an address translation database lookup. The second endpoint identifier is similarly associated with the destination client device. In this embodiment, the VoIP address comprises at least a PSTN number and a suffix comprising an "@" followed by a predefined domain name, and the second endpoint identifier is the PSTN number. Thus, the network gateway translates the VoIP address to the PSTN number by removing at least the suffix from the VoIP address.

If the network gateway is limited to serving source and destination clients in a given domain, the suffix removed from a VoIP address will be the same for all translations and will be predefined. In this way, the network gateway is able to translate the VoIP address to the PSTN number without performing an address translation database lookup.

The network gateway then generates a second session initiation message 74 that includes the PSTN number. The second session initiation message 74 may be, for example, an ISUP IAM. The second session initiation message 74 indicates that the source client device wishes to establish a session with the destination client device, and accordingly includes the PSTN number associated with the destination client device.

The network gateway transmits the second session initiation message 74 to a switch (or other network element) serving the destination client device, and the switch uses the PSTN number to identify the appropriate destination client device. At step 76, the switch may then ring or otherwise contact the destination client device. In this way, the session may be established between the source client device and the destination client device.

Figure 7:
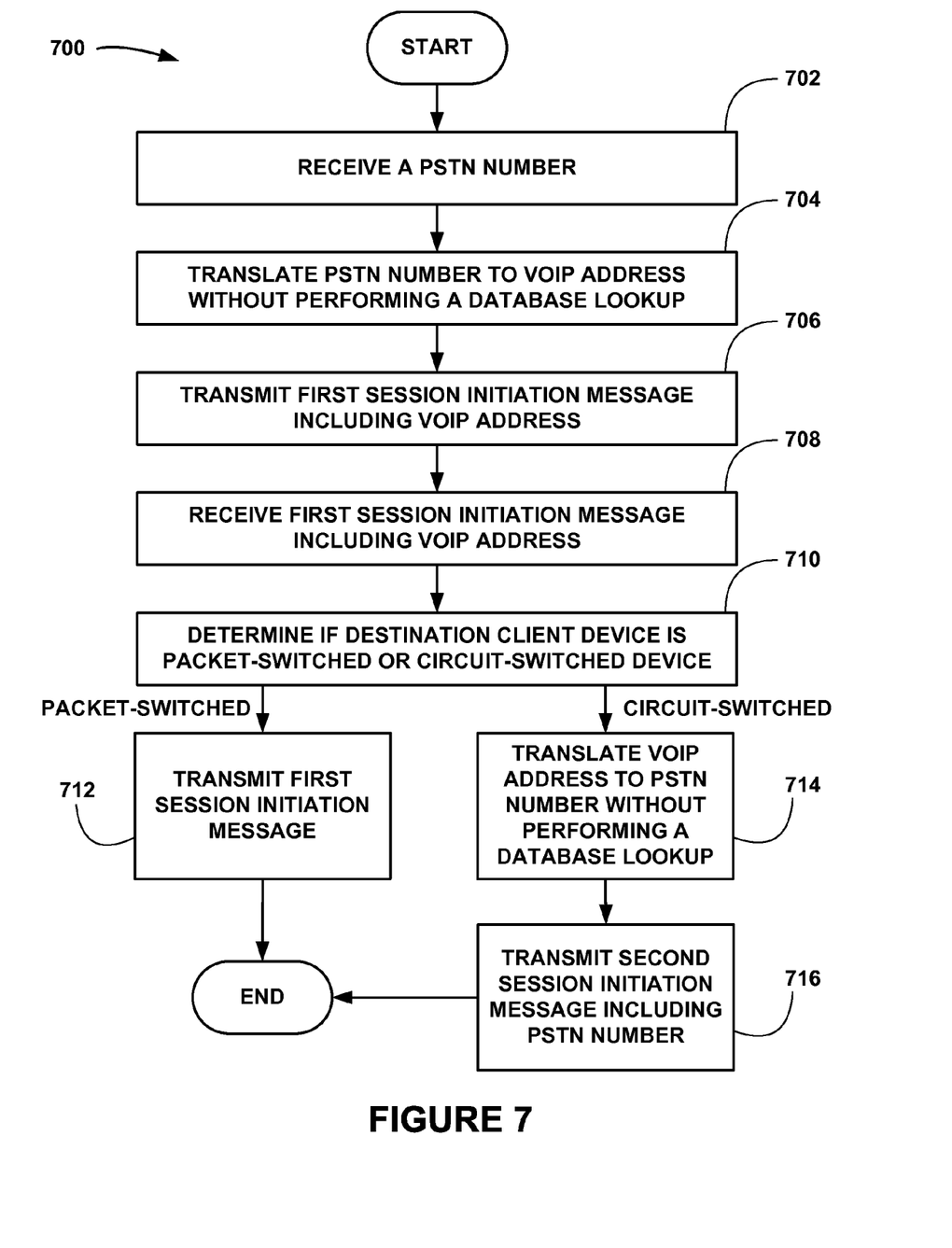
FIG. 7 is a flow chart depicting functions that can be carried out for session establishment, in accordance with an exemplary embodiment.

FIG. 7 is a flow chart depicting a method 700 that can be carried out for session establishment in accordance with an exemplary embodiment. Method 700 begins at step 702 where an application running on a source client device receives from a user a PSTN number that is associated with a destination client device. For example, the source client device may allow a user to enter the information manually (such as by dialing the PSTN number), or to select the information from a list, such as an address book stored on the source client device. Other options are possible as well.

At step 704, the application translates the PSTN number to a VoIP address without performing an address translation database lookup. As in previous embodiments, the VoIP address comprises at least the PSTN number and a suffix comprising an "@" followed by a predefined domain name. Thus, the application translates the PSTN number to the VoIP address by adding at least the suffix to the PSTN number. The client device then transmits the VoIP number to a network element serving the client device, such as a SIP proxy.

At step 706, the network element serving the source client device generates and transmits to a network gateway a first session initiation. The first session initiation message indicates that the source client device is seeking to establish a session with the destination client device and accordingly includes the VoIP address received from the source client device. The first session initiation message may be, for example, a SIP INVITE message.

At step 708, the network gateway receives the first session initiation message including the VoIP address. At step 710, the network gateway determines whether the destination client device is a packet-switched network client device or a circuit-switched network client device. This may involve, for example, the network gateway evaluating the most recent presence status update received regarding the destination client device, as described above. If the network gateway discovers that the most recent presence status of the destination client device indicates that the device is "online", the network gateway may determine that the destination client device is operating as a packet-switched network client device. On the other hand, if the network gateway discovers that the most recent presence status of the destination client device indicates that the device is "offline", the network gateway may determine that the destination client device is operating as a circuit-switched network client device.

If the determination at step 710 is that the destination client device is a packet-switched network client device, the method continues at step 712, where the network gateway transmits the first session initiation message including the VoIP address to a network element (such as a proxy) serving the destination client device. The proxy uses the VoIP address to identify and contact the appropriate destination client device. In this way, the session may be established between the source client device and the destination client device.

On the other hand, if the determination at step 710 is that the destination client device is a circuit-switched network client device (and thus identified by a PSTN number and not a VoIP address), the method continues at step 714 where the network gateway translates the VoIP address back to the PSTN number. As in previous embodiments, the VoIP address comprises at least the PSTN number and a suffix comprising an "@" followed by a predefined domain name. Thus, the network gateway translates the VoIP address back to the PSTN number by removing at least the suffix from the VoIP address.

At step 716, the network gateway generates a second session initiation message that indicates that the source client device is seeking to establish a session with the destination client device and accordingly includes the PSTN number. The second session initiation message may be, for example, an ISUP IAM. The network gateway then transmits the second session initiation message including the PSTN number to a network element (such as a switch) serving the destination client device. The switch uses the PSTN number to identify and contact the appropriate destination client. In this way, the session may be established between the source client device and the destination client device.

Figure 8:
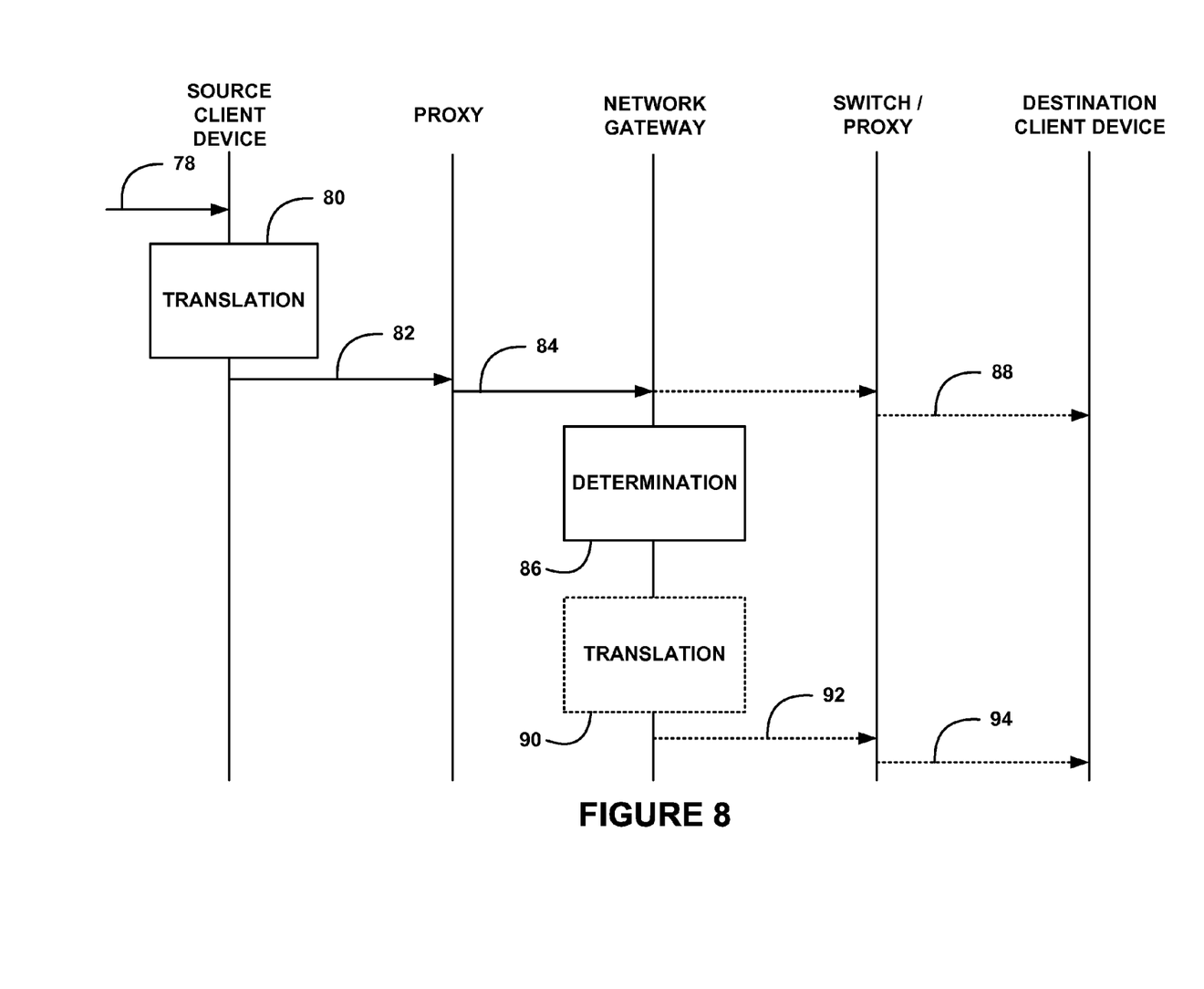
FIG. 8 is a simplified call flow illustrating a method for session establishment, in accordance with an exemplary embodiment.

FIG. 8 is a simplified call flow illustrating a method for session establishment, in accordance with an exemplary embodiment. FIG. 8 illustrates an embodiment in which the source client device is a packet-switched network device and the destination client device may be either a circuit-switched or a packet-switched client device. Thus, the source client device may be served by a packet-switched network device, shown as a SIP proxy, and the destination client device may be served by either a circuit-switched network device, such as a standard telephone switch, or a packet-switched network device, such as a SIP proxy.

At step 78, a PSTN number associated with the destination client device is received from a user by an application running on the client device. At step 80, the source client device translates the PSTN number to a corresponding VoIP address without performing an address translation database lookup. As in previous embodiments, the VoIP address comprises at least the PSTN number and a suffix comprising an "@" followed by a predefined domain name. Thus, the application translates the PSTN number to the VoIP address by adding at least the suffix to the PSTN number. The VoIP address is similarly associated with the destination client device.

At step 82, the source client device transmits the VoIP address to the proxy serving the source client device. The proxy then generates a first session initiation message 84 that indicates that the source client device wishes to establish a session with the destination client device and accordingly includes the VoIP address. The first session initiation message 84 may be, for example, a SIP INVITE message. The proxy transmits the first session initiation message 84 to the network gateway.

The network gateway receives the first session initiation message 84 including the VoIP address. At step 86, the network gateway then determines whether the destination client device is (or is currently operating as) a packet-switched network client device or a circuit-switched network client device, as described above.

If the determination is that the destination client device is a packet-switched network client device, the network gateway transmits the first session initiation message 84 including the VoIP address to a packet-switched network element serving the destination client device. The packet-switched network element uses the VoIP address to identify the appropriate destination client device and, at step 88, the packet-switched network element contacts the destination client device. In this way, the session may be established between the source client device and the destination client device.

If the determination is that the destination client device is a circuit-switched network client device, the network gateway translates the VoIP address back to the PSTN number, without performing an address translation database lookup, at step 90. As in previous embodiments, the VoIP address comprises at least the PSTN number and a suffix comprising an "@" followed by a predefined domain name. Thus, the network gateway translates the VoIP address back to the PSTN number by removing at least the suffix from the VoIP address.

The network gateway then generates a second session initiation message 92 including the PSTN number. The second session initiation message 92 may be, for example, an ISUP IAM. The second session initiation message 92 indicates that the source client device wishes to establish a session with the destination client device identified by the PSTN number, and accordingly includes the PSTN address. The network gateway transmits the second session initiation message 92 including the PSTN number to a circuit-switched network element serving the destination client device. At step 94, the circuit-switched network element uses the PSTN number to identify and contact the appropriate destination client device. In this way, the session may be established between the source client device and the destination client device.

3. Conclusion

An exemplary embodiment has been described above. It should be understood, however, that variations from the embodiment discussed are possible, while remaining within the true spirit and scope of the invention as claimed.

We claim:

1. A method for session establishment, the method comprising, in order:
  a network gateway receiving a first session initiation message, wherein the first session initiation message defines a request from a source client device seeking to establish a session with a destination client device, wherein the first session initiation message contains a first endpoint identifier, wherein the first endpoint identifier is associated with the destination client device, wherein the first session initiation message is an Integrated Service Digital Network User Part (ISUP) Initial Address Message (IAM), and wherein the source client device is a circuit-switched network client device and the destination client device is a packet-switched network client device;
  the network gateway translating the first endpoint identifier to a second endpoint identifier without performing any address translation database lookup for the translating, wherein the first endpoint identifier is a Public Switched Telephone Network (PSTN) number and the second endpoint identifier is a Voice over Internet Protocol (VoIP) address comprising at least the PSTN number and a suffix, wherein the suffix comprises an "@" followed by a predefined domain name, and wherein the network gateway translating the first endpoint identifier to the second endpoint identifier without performing any address translation database lookup for the translating comprises the network gateway translating the PSTN number to the VoIP address by adding at least the suffix to the PSTN number;
  the network gateway generating a second session initiation message, wherein the second session initiation message contains the second endpoint identifier; and
  the network gateway transmitting the second session initiation message to a network element serving the destination client device, to facilitate establishment of the session between the source client device and the destination client device, wherein the session is a call, and wherein the second session initiation message is a Session Initiation Protocol (SIP) INVITE message.

2. A method for session establishment, the method comprising, in order:
  an application running on a source client device receiving a Public Switched Telephone Network (PSTN) number associated with a destination client device;
  the application translating the PSTN number to a Voice over Internet Protocol (VoIP) address without performing any address translation database lookup for the translating, wherein the VoIP address comprises at least the PSTN number and a suffix comprising an "@" followed by a predefined domain name, and wherein the application translating the PSTN number to the VoIP address without performing any address translation database lookup for the translating comprises the application adding at least the suffix to the PSTN number;
  generating and transmitting a first session initiation message, wherein the first session initiation message defines a request from the source client device seeking to establish a session with the destination client device, wherein the first session initiation message contains the VoIP address, and wherein the first session initiation message is a Session Initiation Protocol (SIP) INVITE message;
  a network gateway receiving the first session initiation message;
  the network gateway determining whether the destination client device is currently operating as a packet-switched network client device or a circuit-switched network client device;
  if the determination is that the destination client device is operating as a packet-switched network client device, the network gateway transmitting the first session initiation message to a network element serving the destination client device, to facilitate establishment of the session between the source client device and the destination client device; and
  if the determination is that the destination client device is operating as a circuit-switched network client device, the network gateway translating the VoIP address back to the PSTN number without performing an address translation database lookup by removing at least the suffix from the VoIP address, generating a second session initiation message containing the PSTN number, wherein the second session initiation message is an Integrated Service Digital Network User Part (ISUP) Initial Address Message (IAM), and wherein the second session initiation message defines a request from the source client device seeking to establish a session with the destination client device, and transmitting the second session initiation message to a network element serving the destination client device, to facilitate establishment of the session between the source client device and the destination client device.

3. A network gateway comprising:
a communication interface;
a processor;
data storage; and
translation logic,
  the communication interface being operable to receive a first session initiation message, wherein the first session initiation message defines a request from a source client device seeking to establish a session with a destination client device, and contains a first endpoint identifier, wherein the first endpoint identifier is associated with the destination client device, wherein the first session initiation message is an Integrated Service Digital Network User Part (ISUP) Initial Address Message (IAM), and wherein the source client device is a circuit-switched network client device and the destination client device is a packet-switched network client device, the communication interface being further operable to transmit a second session initiation message to a network element serving the destination client device, to facilitate establishment of the session between the source client device and the destination client device, wherein the second session initiation message contains a second endpoint identifier, and wherein the second session initiation message is a Session Initiation Protocol (SIP) INVITE message, the translation logic being executable by the processor to map the first endpoint identifier to the second endpoint identifier without performing any address translation database lookup for the translating, wherein the first endpoint identifier is a Public Switched Telephone Network (PSTN) number and the second endpoint identifier is a Voice over Internet Protocol (VoIP) address comprising at least the PSTN number and a suffix, wherein the suffix comprises an "@" followed by a predefined domain name, and wherein the network gateway translating the first endpoint identifier to the second endpoint identifier without performing any address translation database lookup for the translating comprises the network gateway translating the PSTN number to the VoIP address by adding at least the suffix to the PSTN number, and the translation logic being further executable by the processor to generate the second session initiation message containing the second endpoint identifier, for transmission of the second session initiation message by the communication interface, wherein the session is a call.

4. The network gateway of claim 3, wherein each of the source client device and the destination client device has a respective device type selected from the group consisting of a packet-switched network client device and a circuit-switched network client device, the network gateway further comprising determination logic, wherein the determination logic is executable by the processor to determine if the device types of the source client device and the destination client device are the same, and if the determination is that the device types are the same, to not execute the translation logic in response to receipt of the first session initiation message, and if the determination is that the device types are not the same, to execute the translation logic in response to receipt of the first session initiation message.

\* \* \* \* \*